(12) United States Patent
Hashimoto et al.

(10) Patent No.: US 11,776,106 B2
(45) Date of Patent: Oct. 3, 2023

(54) APPEARANCE INSPECTION SYSTEM

(71) Applicant: HONDA MOTOR CO., LTD., Tokyo (JP)

(72) Inventors: Yoshinari Hashimoto, Tokyo (JP); Daisuke Ito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 17/319,118

(22) Filed: May 13, 2021

(65) Prior Publication Data

US 2021/0358111 A1 Nov. 18, 2021

(30) Foreign Application Priority Data

May 18, 2020 (JP) ................................. 2020-086523

(51) Int. Cl.
*G06T 7/90* (2017.01)
*G06T 7/00* (2017.01)

(52) U.S. Cl.
CPC .............. *G06T 7/0004* (2013.01); *G06T 7/90* (2017.01); *G06T 2207/10024* (2013.01); *G06T 2207/30164* (2013.01)

(58) Field of Classification Search
CPC ...................... G06T 7/0004; G06T 7/90; G06T 2207/10024; G06T 2207/30164; G01N 21/8806; G01N 21/01; G01N 21/8851; G01N 2021/8887
USPC ........................................................ 382/152
See application file for complete search history.

(56) References Cited

U.S. PATENT DOCUMENTS

| | | | |
|---|---|---|---|
| 2007/0012096 A1* | 1/2007 | Galtier | ...................... F01L 1/34 73/114.31 |
| 2011/0091846 A1* | 4/2011 | Kreindl | .................. B23K 9/095 434/234 |
| 2012/0069173 A1* | 3/2012 | Takahashi | .......... G01N 21/9515 348/92 |
| 2014/0160471 A1* | 6/2014 | Ueno | ................. G01N 21/9501 359/230 |
| 2014/0233024 A1* | 8/2014 | Taniguchi | .......... G01N 21/9501 356/237.5 |
| 2014/0253912 A1* | 9/2014 | Honda | ............... G01N 21/9501 356/237.5 |
| 2017/0307544 A1 | 10/2017 | Nagata | |

FOREIGN PATENT DOCUMENTS

| | | |
|---|---|---|
| JP | 6179159 | 8/2017 |
| JP | 6370177 | 7/2018 |
| JP | 2020-051998 | 4/2020 |

* cited by examiner

*Primary Examiner* — Ali Bayat
(74) *Attorney, Agent, or Firm* — AMIN, TUROCY & WATSON, LLP

(57) ABSTRACT

An appearance inspection system is equipped with illumination devices that irradiate light, and retaining tools that retain an object to be inspected. Light receiving devices are disposed at locations (irradiated locations) which are on the retaining tools and are irradiated with the light emitted by the illumination devices. A determination unit of the appearance inspection system determines that an "inspection condition is not satisfied" when a measured value of a luminance measured with the light receiving devices is less than or equal to a preset reference value. Grayscale charts may be provided instead of the light receiving devices.

10 Claims, 6 Drawing Sheets

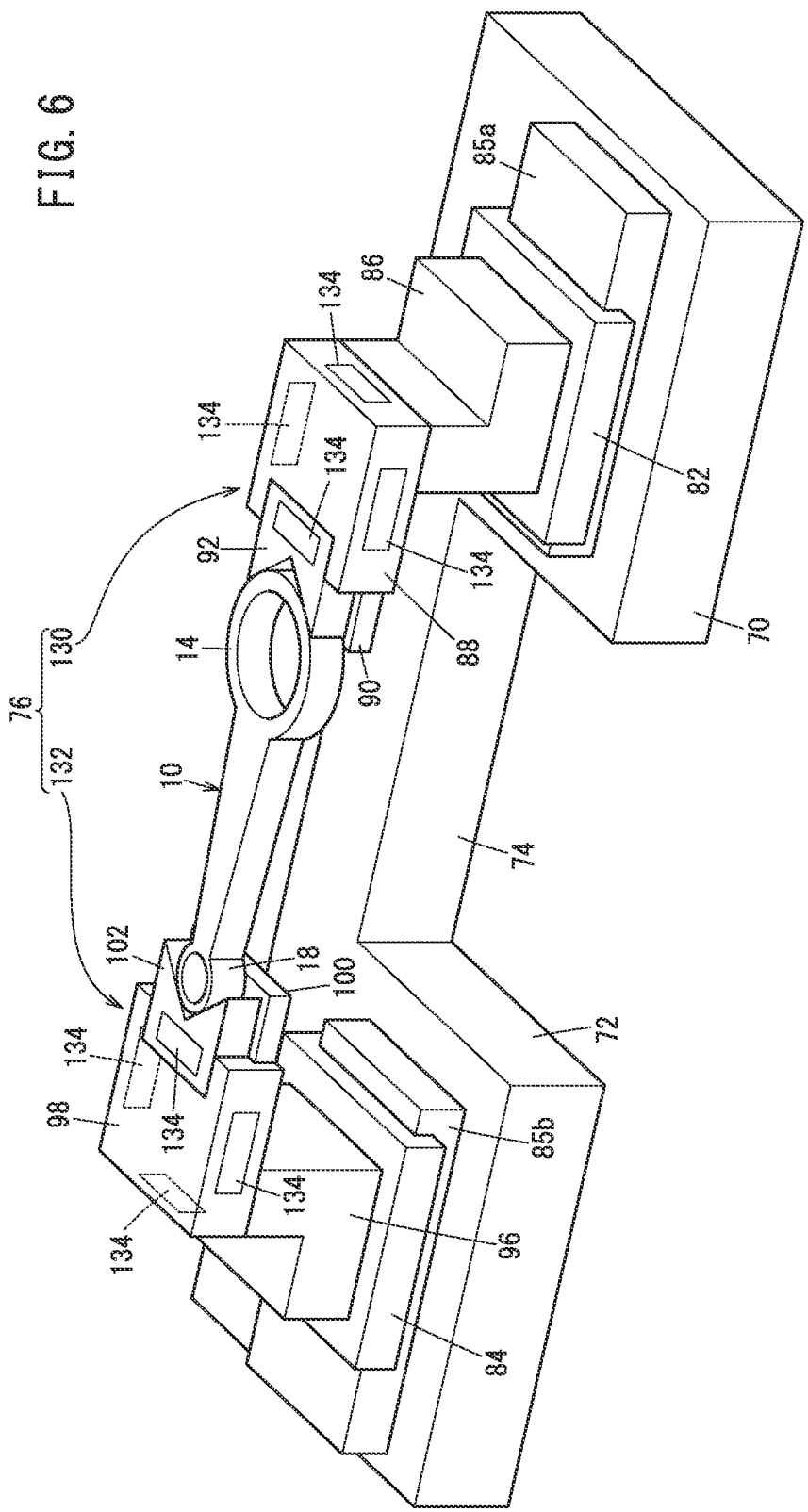

APPEARANCE INSPECTION SYSTEM

CROSS-REFERENCE TO RELATED APPLICATION

This application is based upon and claims the benefit of priority from Japanese Patent Application No. 2020-086523 filed on May 18, 2020, the contents of which are incorporated herein by reference.

BACKGROUND OF THE INVENTION

Field of the Invention

The present invention relates to an appearance inspection system for determining whether the external appearance of an object to be inspected is good or bad.

Description of the Related Art

A concern exists in relation to the durability of a connecting rod which includes a defect in the external appearance thereof such as a scratch or a dent. Thus, conventionally, connecting rods are irradiated with light to carry out an appearance inspection to determine whether the external appearance thereof is good or bad, and only acceptable products are supplied to an assembly process for an internal combustion engine.

As an appearance inspection system for carrying out an inspection of the external appearance, the systems disclosed in Japanese Patent No. 6179159 and Japanese Patent No. 6370177 are known. For example, in the inspection device disclosed in Japanese Patent No. 6370177, as shown in FIG. 1, an inspection of the external appearance of an upper surface side of a connecting rod is initially carried out. Thereafter, the connecting rod is turned upside down, and an inspection of the external appearance of a lower surface side is carried out. As shown in FIG. 7A of Japanese Laid-Open Patent Publication No. 2020-051998, a feature is also known in which a connecting rod, for which an inspection of the external appearance of an upper surface side thereof has been completed on an upstream side of a direction in which the connecting rod is transported, is turned upside down, and then an inspection is carried out on a lower surface side thereof on a downstream side in the transport direction.

After light has been irradiated thereon, a camera captures inspection images of the connecting rod. The inspection images are transmitted to a computer, whereupon the computer compares the inspection images with control images obtained from a reference sample that does not include any defects (scratches) thereon. In the case that the connecting rod contains a defect, such a location is shown more darkly than in the control images. Stated otherwise, the location exhibits a low luminance. The computer which has recognized such a condition determines the connecting rod of the inspected object to be an "unacceptable product".

SUMMARY OF THE INVENTION

In the aforementioned inspection of the external appearance, even though the object to be inspected is one including a defect such as a scratch or the like, locations thereof for which the luminance is low may not be detected, and such an object may be determined as being an "acceptable product". Therefore, in this type of appearance inspection system, an improvement is sought in relation to the reliability of the inspection result.

The present invention has been devised in order to solve the aforementioned problem, and has the object of providing an appearance inspection system which is capable of improving the reliability of the inspection result, and of assuring the product quality of the objects to be inspected.

In order to achieve the aforementioned object, according to one embodiment of the present invention, an appearance inspection system is provided, which is configured to determine whether an external appearance of an object to be inspected is good or bad based on a captured image of the object to be inspected, the appearance inspection system comprising:

a retaining tool configured to retain the object to be inspected;

an illumination device configured to irradiate light onto the object to be inspected that is retained by the retaining tool;

an image capturing device configured to capture an image of the object to be inspected irradiated with the light; and a determination unit configured to determine whether the external appearance of the object to be inspected is good or bad, based on an image of the object to be inspected obtained by the image capturing device, wherein a light receiving device is provided on an irradiated location which is on the retaining device and is irradiated with the light emitted by the illumination device; and the determination unit determines that an inspection condition is not satisfied when a measured value of a luminance measured with the light receiving device is less than or equal to a preset reference value.

According to another embodiment of the present invention, an appearance inspection system is provided, which is configured to determine whether an external appearance of an object to be inspected is good or bad based on a captured image of the object to be inspected, the appearance inspection system comprising:

a retaining tool configured to retain the object to be inspected;

an illumination device configured to irradiate light onto the object to be inspected that is retained by the retaining tool;

an image capturing device configured to capture an image of the object to be inspected irradiated with the light; and a determination unit configured to determine whether the external appearance of the object to be inspected is good or bad, based on an image of the object to be inspected obtained by the image capturing device, wherein a grayscale chart is provided on an irradiated location which is on the retaining device and is irradiated with the light emitted by the illumination device, the determination unit acquires a luminance or a gradation value of the grayscale chart, from a captured image of the grayscale chart captured by the image capturing device, and the determination unit determines that an inspection condition is not satisfied when the acquired luminance or gradation value of the grayscale chart is less than or equal to a preset reference value.

According to the present invention, the light receiving device or the grayscale chart is provided on the retaining tool, and the luminance or the like of the light radiated thereon is obtained. In addition, when the luminance or the like is less than or equal to the preset reference value, a determination is made that "the inspection condition does not satisfy a predetermined condition, and the inspection condition is not satisfied".

By doing so, for example, when the luminance of the entire inspection images that were captured is low and it is not easy to distinguish between defects and the outer surface on the object to be inspected, the inspected object can be excluded in the same manner as the unacceptable product. For this reason, since it is possible to avoid erroneously determining an unacceptable product as being an "acceptable product," the reliability of the inspection result is improved. Further, in accordance with this feature, it is easy to assure the product quality of the acceptable product.

In addition, in this case, it is sufficient to provide the light receiving device or the grayscale chart in the retaining device, and there is no necessity to incorporate a further mechanism, or to implement a change or a modification in the design layout. Accordingly, it is possible to avoid a situation in which the configuration of the appearance inspection system is made complicated, and to improve the reliability of the inspection result at a low cost.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 6 is a schematic overall perspective view of retaining tools (a first gripping claw and a second gripping claw) constituting an appearance inspection system according to a second embodiment.

DESCRIPTION OF THE PREFERRED EMBODIMENTS

Hereinafter, preferred embodiments of an appearance inspection system according to the present invention will be presented and described in detail below with reference to the accompanying drawings. Moreover, according to the embodiments, a case is exemplified in which a connecting rod serves as an object to be inspected.

Figure 1:
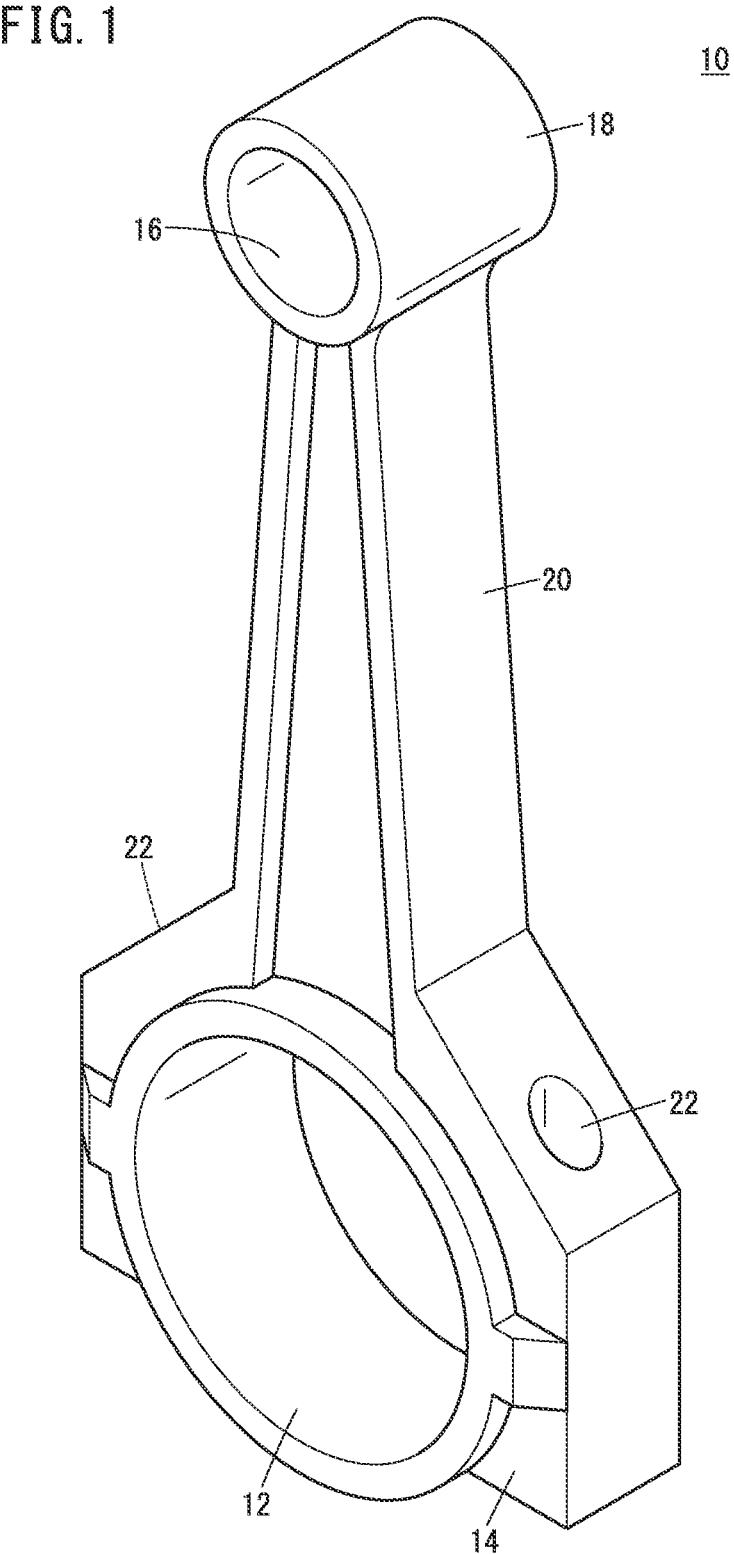
FIG. 1 is a schematic overall perspective view of a connecting rod which is an example of an object to be inspected.

Initially, an outline description will be given concerning a connecting rod 10 shown in FIG. 1. The connecting rod 10 includes a large end portion 14 in which a large insertion hole 12 is formed through which a non-illustrated crankshaft is passed, and a small end portion 18 in which a small insertion hole 16 is formed through which a non-illustrated piston pin is passed. An inner diameter and an outer diameter of the large insertion hole 12 are larger than those of the small insertion hole 16, and therefore, the large end portion 14 is wider than the small end portion 18. A substantially prismatic shaped rod portion 20 is interposed between the large end portion 14 and the small end portion 18. The connecting rod 10 having such a shape is manufactured, for example, by way of forging.

Bolt holes 22 extending substantially parallel to the direction in which the rod portion 20 extends are formed on both the left and right sides of the large end portion 14. Before the crankshaft is passed through the large end portion 14, the large insertion hole 12 is broken so as to be substantially divided into two sections along a direction substantially perpendicular to the direction in which the rod portion 20 extends. In addition, after having sandwiched the crankshaft between the broken portions, non-illustrated connecting bolts are passed through the bolt holes 22, and nuts are screwed onto the connecting bolts. Consequently, the crankshaft is passed through the large insertion hole 12, and further, the broken portions are connected to each other.

Figure 2:
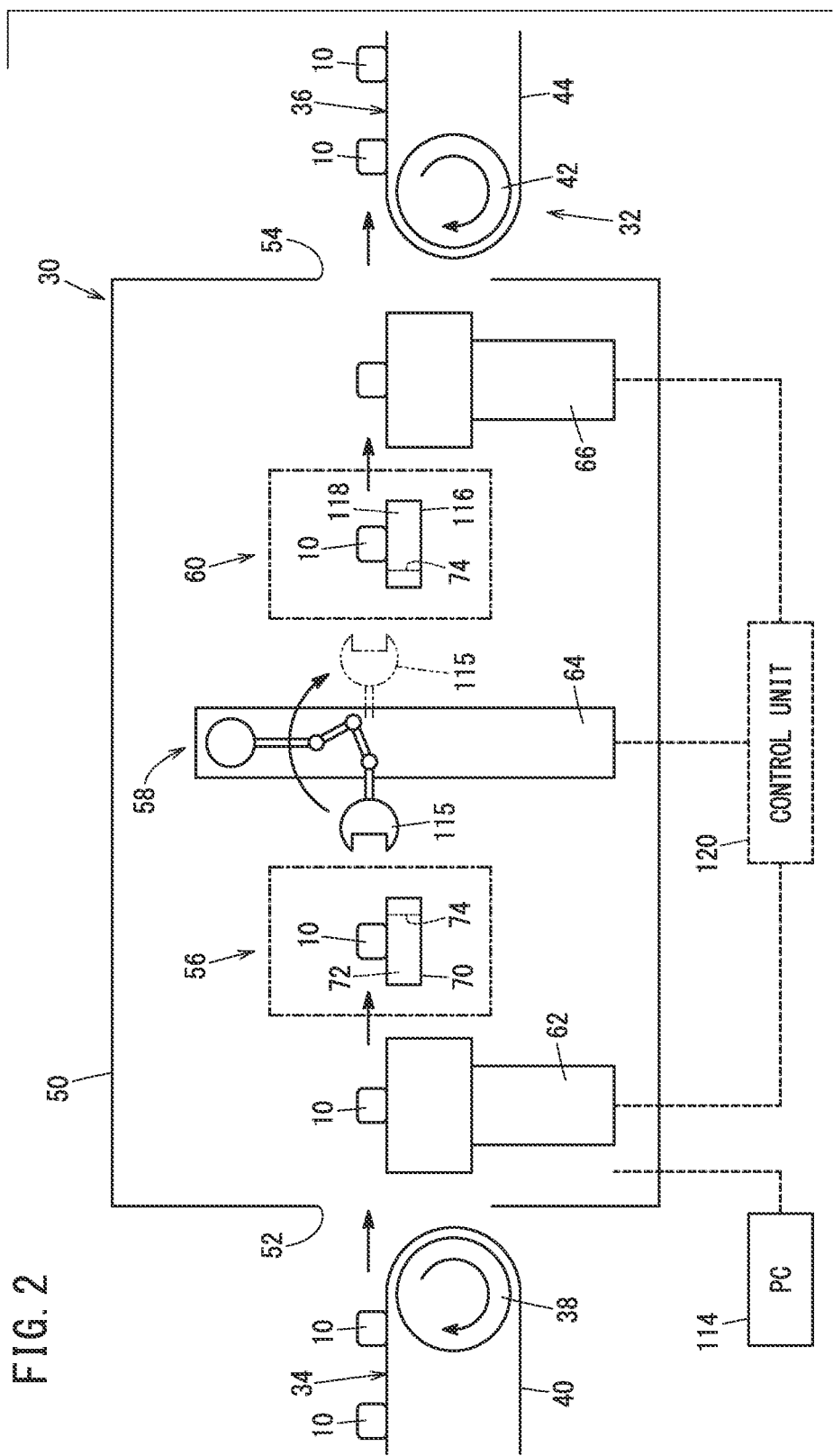
FIG. 2 is a schematic outline diagram of an appearance inspection system according to a first embodiment.

Next, a description will be given with reference to FIGS. 2 to 4 concerning an appearance inspection system 30 according to the first embodiment. As shown in FIG. 2, the appearance inspection system 30 is provided on a transport line 32 on which the connecting rod 10 is transported. In this instance, the transport line 32 has a carry-in side conveyor 34 and a carry-out side conveyor 36. The carry-in side conveyor 34 includes a plurality of first rollers 38 and a first belt 40 that circulates therearound as the first rollers 38 rotate, and is located on an upstream side of the appearance inspection system 30.

On the other hand, the carry-out side conveyor 36 includes a plurality of second rollers 42 and a second belt 44 that circulates therearound as the second rollers 42 rotate, and is located on a downstream side of the appearance inspection system 30. More specifically, the appearance inspection system 30 is arranged at a position interposed between the carry-in side conveyor 34 and the carry-out side conveyor 36. It goes without saying that the carry-in side conveyor 34 conveys the connecting rod 10 in a direction of being supplied to the appearance inspection system 30, and the carry-out side conveyor 36 conveys the connecting rod 10 in a direction of being discharged from the appearance inspection system 30.

Although not shown in particular, a first transfer robot and a second transfer robot are arranged respectively between the carry-in side conveyor 34 and the appearance inspection system 30, and between the appearance inspection system 30 and the carry-out side conveyor 36.

The appearance inspection system 30 includes a housing 50 for blocking external light such as sunlight and interior lighting or the like. A conveyor inlet 52 and a conveyor outlet 54 are formed on wall portions of the housing 50 facing respectively the carry-in side conveyor 34 and the carry-out side conveyor 36. Further, the interior of the housing 50 is roughly divided into a first inspection unit 56, an inversion unit 58, and a second inspection unit 60. Furthermore, a first moving platform 62, an inverting operation robot 64, and a second moving platform 66 are provided inside the housing 50. Among such elements, the first moving platform 62 is capable of moving from the vicinity of the conveyor inlet 52 to a table 70 (see FIG. 3) of the first inspection unit 56, or alternatively, from the table 70 to the vicinity of the conveyor inlet 52.

Figure 3:
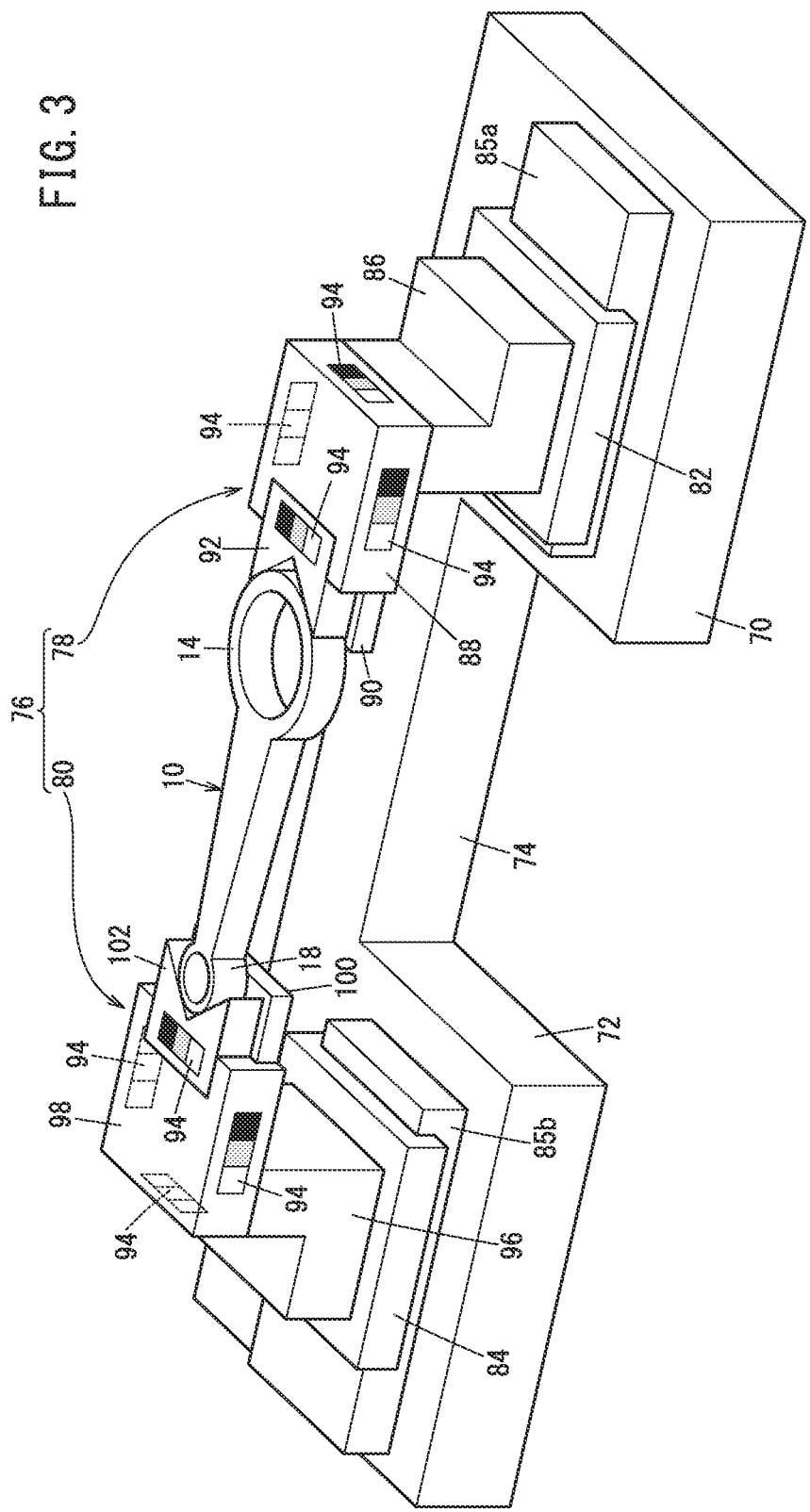
FIG. 3 is a schematic perspective view of main components of a first inspection unit constituting the appearance inspection system.

As shown in FIG. 3, a reception opening 72 is formed on the side of the table 70, the side facing the conveyor inlet 52, and a through window 74 is formed substantially in the center thereof. The reception opening 72 extends up to the through window 74.

Further, on the table 70, a first gripping claw 78 and a second gripping claw 80 (both of which serve as retaining tools) that make up a chuck 76 are arranged so as to be capable of being brought into proximity or separated away from edge portions of the through window 74. More specifically, two non-illustrated linear actuators which extend along the direction in which the rod portion 20 extends (a direction perpendicular to the paper surface of FIG. 2) are embedded in the table 70 so as to be aligned along the same axis while sandwiching the through window 74 therebetween. The first gripping claw 78 is disposed on a first slider 82 of one of the linear actuators, and the second gripping claw 80 is disposed on a second slider 84 of the other one of the linear actuators. The first gripping claw 78 and the second gripping claw 80 are brought into proximity or separated away from each other, accompanying movement of the first slider 82 and the second slider 84 into proximity or away from each other along guide rails 85a and 85b.

When the first gripping claw 78 and the second gripping claw 80 approach each other, the first gripping claw 78 presses the large end portion 14 of the connecting rod 10 toward the side of the small end portion 18, whereas the second gripping claw 80 presses the small end portion 18 toward the side of the large end portion 14. As a result, the connecting rod 10 is retained or positioned above the through window 74. In contrast thereto, when the first gripping claw 78 and the second gripping claw 80 are separated away from each other, the connecting rod 10 is released from being gripped by the chuck 76.

The first gripping claw 78 includes a first L-shaped block 86 connected to the first slider 82, and a first stay block 88 connected to an upper end surface of the first L-shaped block 86. On an end of the first stay block 88 facing the through window 74, there are provided a first mounting block 90 on which the large end portion 14 is mounted, and a first pressing block 92 positioned above the first mounting block 90 and separated a predetermined interval away from the first mounting block 90. The large end portion 14 is mounted on the first mounting block 90, and an outer peripheral wall of the large insertion hole 12 is placed in abutment against a curved distal end surface of the first pressing block 92.

Plates on which grayscale charts 94 are posted are attached, respectively, to a rear end surface of the first stay block 88 which is a rear surface opposite to a distal end part thereof facing the through window 74, to both side surfaces of the first stay block 88 extending along the direction in which the rod portion 20 extends, and to an upper surface of the first pressing block 92. More specifically, four individual grayscale charts 94 are provided on the first gripping claw 78. Although it is sufficient for each of the grayscale charts 94 to be formed of three gradations, for example, of white, a gray with a reflectance of 18% (so-called 18% gray), and black, the gradations are not particularly limited to these colors.

The second gripping claw 80 is configured in the same manner as the first gripping claw 78. More specifically, the second gripping claw 80 includes a second L-shaped block 96 connected to the second slider 84, and a second stay block 98 connected to an upper end surface of the second L-shaped block 96. On an end of the second stay block 98 facing the through window 74, there are provided a second mounting block 100 on which the small end portion 18 is mounted, and a second pressing block 102 positioned above the second mounting block 100 and separated a predetermined interval away from the second mounting block 100. The small end portion 18 is mounted on the second mounting block 100, and an outer peripheral wall of the small insertion hole 16 is placed in abutment against a curved distal end surface of the second pressing block 102.

Plates on which grayscale charts 94 are posted are attached, respectively, to a rear end surface of the second stay block 98 which is a rear surface opposite to a distal end part thereof facing the through window 74, to both side surfaces of the second stay block 98 extending along the direction in which the rod portion 20 extends, and to an upper surface of the second pressing block 102. More specifically, four individual grayscale charts 94 are provided on the second gripping claw 80 as well. Each of the grayscale charts 94 may be formed of three gradations of white, 18% gray, and black in the same manner as described above, or may be formed of gradations in addition thereto.

Figure 4:
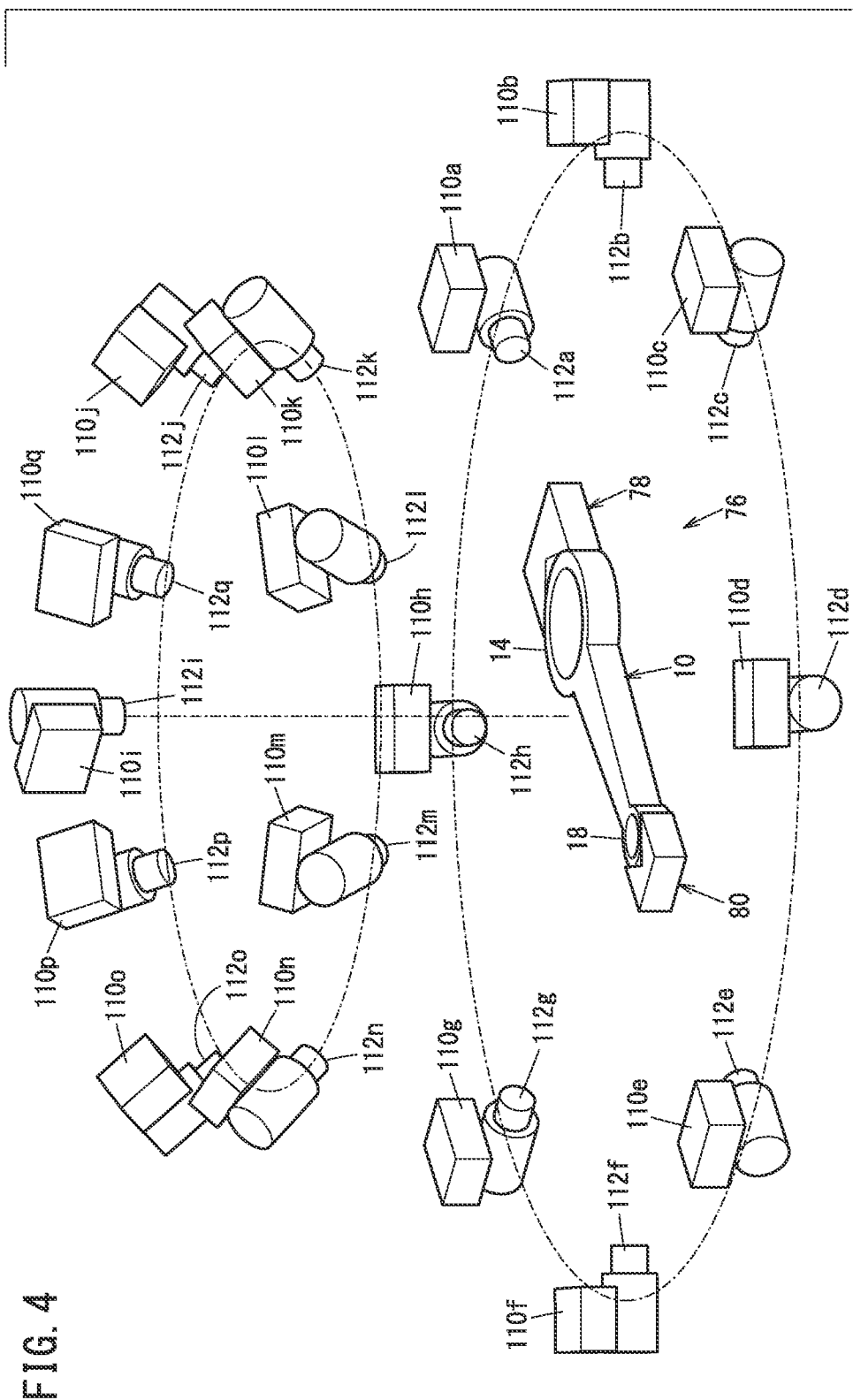
FIG. 4 is a schematic perspective view of main components of the first inspection unit, showing a positional relationship between illumination devices and image capturing devices.

As shown in FIG. 4, in the vicinity of the table 70, an assembly is arranged in which each of respective illumination devices 110a to 110q, and each of respective cameras 112a to 112q that serve as image capturing devices are integrally combined. Eight individual illumination devices 110a to 110h irradiate light that travels in a horizontal direction from substantially the same height as the table 70. Further, one of the illumination devices 110i irradiates light from above the table 70 toward the through window 74 which is positioned vertically therebelow. In addition, eight of the illumination devices 110j to 110q irradiate light that travels so as to be inclined at roughly 45° with respect to the vertical direction, from positions where crossing angles thereof with respect to the table 70 are roughly 45°. More specifically, seventeen individual illumination devices 110a to 110q and cameras 112a to 112q are provided on the first inspection unit 56. In addition, all of the light travels toward the connecting rod 10 which is positioned above the through window 74 by the chuck 76.

The seventeen individual cameras 112a to 112q capture inspection images of the connecting rod 10 that is irradiated with light. Stated otherwise, the cameras 112a to 112q obtain captured images of the connecting rod 10. In this instance, each of the four individual grayscale charts 94 (eight in total), which are provided on the first gripping claw 78 and the second gripping claw 80, are irradiated with light from the illumination devices 110a to 110q. More specifically, the eight individual grayscale charts 94 are disposed at irradiated locations on the first gripping claw 78 and the second gripping claw 80. Further, the grayscale charts 94 are positioned within the image capturing ranges of the cameras 112a to 112q. Ultimately, when the cameras 112a to 112q capture inspection images of the connecting rod 10, all of the eight individual grayscale charts 94, which are in a state of being irradiated with light, are reflected in the inspection images.

The inspection images, which include the connecting rod 10 and the grayscale charts 94, are transmitted to a computer 114 that serves as a determination unit. Control images of a reference sample, in which defects such as scratches, dents, and surface roughness or the like do not exist, are stored in a hard disk drive of the computer 114. The computer 114 compares the inspection images of the connecting rod 10, which is the object to be inspected, with the control images of the reference sample, and determines whether or not a defect such as a scratch or the like exists on the connecting rod 10 as the object to be inspected. In the case that a defect does not exist, the connecting rod 10 is judged to be "good (an acceptable product)," and in the case that a defect exists, the connecting rod 10 is judged to be "bad (an unacceptable product)". Moreover, if time is required in order to determine using only one computer 114 whether the product quality is good or bad based on the inspection images, a plurality of computers 114 may be provided so that processing for determining whether the product quality is good or bad is performed by a plurality of parts.

Similarly, in the second inspection unit 60 as well, a table 116 is provided on which the connecting rod 10 is received from the inversion unit 58. The second moving platform 66 is capable of moving from the table 116 to the vicinity of the conveyor outlet 54, or alternatively, from the vicinity of the conveyor outlet 54 to the table 116. An evacuation opening 118 connected to the through window 74 is formed on the side of the table 116, the side facing the conveyor outlet 54. The second moving platform 66 enters the through window 74 from the evacuation opening 118, whereas the second moving platform 66 advances from the through window 74 via the evacuation opening 118.

The second inspection unit 60 is configured in the same manner as the first inspection unit 56. Accordingly, constituent elements thereof which are the same as the constituent elements of the first inspection unit 56 are designated with the same reference numerals, and illustration and detailed description thereof are omitted.

The inverting operation robot 64 is disposed on the inversion unit 58 between the first inspection unit 56 and the second inspection unit 60. A gripping hand 115 is provided on a distal end arm of the inverting operation robot 64, and the gripping hand 115 is capable of gripping, for example, the rod portion 20 of the connecting rod 10. It goes without saying that the distal end arm is capable of being rotated by an angle of 180° or greater.

The appearance inspection system 30 further includes a non-illustrated exclusion conveyor. The exclusion conveyor, for example, is located adjacent to the housing 50, so as to extend in a direction substantially perpendicular to the carry-in side conveyor 34 and the carry-out side conveyor 36. The exclusion conveyor is a line for excluding connecting rods 10 that have been determined to be unacceptable products, and for transporting such unacceptable products out to the exterior of the housing 50.

The appearance inspection system 30 according to the first embodiment is basically configured in the manner described above. Next, operations and advantageous effects thereof will be described. The following operations of the appearance inspection system 30 are performed under a control action of a control unit 120 that constitutes part of the appearance inspection system 30.

The connecting rod 10 whose appearance is to be inspected is conveyed to the housing 50 by the circulating operation of the first belt 40 of the carry-in side conveyor 34. Then, the connecting rod 10 that has arrived in the vicinity of the conveyor inlet 52 of the housing 50 is transferred from the first belt 40 onto the first moving platform 62 by the first transfer robot.

The first moving platform 62 on which the connecting rod 10 is placed moves toward the table 70 of the first inspection unit 56. Due to such movement, the connecting rod 10 is brought into close proximity to the table 70. The first moving platform 62 enters from the reception opening 72 formed in the table 70 and arrives at the through window 74. At this time, the first gripping claw 78, the connecting rod 10, and the second gripping claw 80 are arranged so as to be aligned on substantially the same axis at substantially the same height position. At this point in time, the first gripping claw 78 and the connecting rod 10, and the connecting rod 10 and the second gripping claw 80 are separated from each other by a predetermined interval.

Next, the two linear actuators are synchronously energized, and the first slider 82 and the second slider 84 move along the guide rails 85a and 85b toward the edge portions of the through window 74 so as to approach each other. Accompanying such movement, the first gripping claw 78 is brought into close proximity to the large end portion 14, and the second gripping claw 80 is brought into close proximity to the small end portion 18. Lastly, the large end portion 14 is mounted on the first mounting block 90, and the outer peripheral wall of the large insertion hole 12 is placed in abutment against the curved distal end surface of the first pressing block 92. Further, the small end portion 18 is mounted on the second mounting block 100, and the outer peripheral wall of the small insertion hole 16 is placed in abutment against the curved distal end surface of the second pressing block 102.

As a result, the first gripping claw 78 presses the large end portion 14 of the connecting rod 10 toward the side of the small end portion 18, and the second gripping claw 80 presses the small end portion 18 toward the side of the large end portion 14. Consequently, the connecting rod 10 is gripped (retained) by the chuck 76, and is positioned and fixed above the through window 74. At this point in time, the first moving platform 62 may be returned to its original position in the vicinity of the conveyor inlet 52.

Next, light is emitted toward the connecting rod 10 from the seventeen individual illumination devices 110a to 110q. As noted previously, light that travels in a horizontal direction is emitted from the eight individual illumination devices 110a to 110h, light that travels vertically downward is emitted from one of the illumination devices 110i, and light that travels so as to be inclined at roughly 45° with respect to the vertical direction is emitted from the remaining eight individual illumination devices 110j to 110q (see FIG. 4).

Simultaneously, the cameras 112a to 112q capture inspection images of an upper half of the connecting rod 10. At this time, the plates attached to the first gripping claw 78, and the grayscale charts 94 that are posted on the plates are reflected in the inspection images. The inspection images, which include the connecting rod 10 and the grayscale charts 94, are transmitted to the computer 114.

Figure 5:
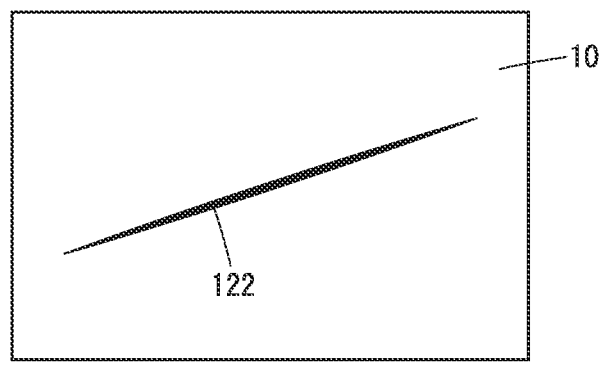
FIG. 5 is an explanatory diagram showing an inspection image when a defect (scratch) is present.

FIG. 5 is an enlarged view of a principal part of an inspection image when the connecting rod 10 has a scratch 122 thereon. As shown in FIG. 5, the scratch 122 appears darker than other portions of the outer surface on which the scratch 122 does not exist. More specifically, the luminance of the scratch 122 is less than or equal to the preset reference value. The same features apply in the case that a dent or surface roughness exists.

In this manner, when a location whose luminance is less than or equal to the reference value exists within the inspection images, the computer 114 which has recognized such a condition determines that "a defective location is included within the connecting rod 10". Namely, in this case, a determination of "bad (an unacceptable product)" is made. The connecting rod 10 which has been determined as being an unacceptable product is released from being gripped by the chuck 76, and thereafter, is transported to the exterior of the housing 50 from the exclusion conveyor.

In contrast thereto, with the connecting rod 10 in which a defect such as the scratch 122 or the like is not included, a location whose luminance is less than or equal to the reference value is not recognized in the inspection images. In this case, the computer 114 tentatively determines that the connecting rod 10 is "good (an acceptable product)".

According to the first embodiment, a luminance or a gradation value (hereinafter, collectively referred to as "luminance or the like") is also determined for a total of eight individual grayscale charts 94 that are reflected in the inspection images. More specifically, a determination is made as to whether or not the luminance or the like of the grayscale charts 94 is less than or equal to the preset reference value. Moreover, the "reference value" is a luminance or the like on grayscale charts 94 (control charts) which are photographed in advance as a control. Stated otherwise, the luminance or the like of the control charts is stored in the hard disk drive of the computer 114.

Then, the computer 114 compares the luminance or the like of the grayscale charts 94 reflected in the inspection images with the luminance or the like (reference value) of the control charts. When a result that the "luminance or the like is less than or equal to the reference value" is obtained for one or more of the eight individual grayscale charts 94, even in the case that, as described above, the computer 114 has tentatively made a determination of "acceptable" from the inspection images of the connecting rod 10, it determines that "the inspection condition is not satisfied".

More specifically, if the luminance or the like of the grayscale charts 94 is less than or equal to the reference value, the computer 114 determines that "the luminance or the like does not satisfy the specified condition," regardless of whether or not the connecting rod 10 is an acceptable product, and transmits the determination result ("the inspection condition is not satisfied") as an information signal to the control unit 120. The control unit 120 that has received such an information signal performs a control to exclude the connecting rod 10 from the exclusion conveyor.

The present inventors have conducted diligent investigations into the reasons why the connecting rod 10 that should be determined to be an unacceptable product due to the occurrence of a defect is determined as being an "acceptable product," and have speculated that the possibility may be caused by a voltage fluctuation or a flicker phenomenon. More specifically, the illumination devices 110a to 110q obtain power from a common power source, and blink at high speed at the same frequency. Accordingly, when the voltage of the power source drops momentarily, or when the illumination devices 110a to 110q are turned off all at once due to flickering, the luminosity of the illumination devices 110a to 110q momentarily decreases. The inspection images that are captured at this time exhibit a lower luminance as a whole, in comparison with inspection images captured when the voltage is restored, or when the illumination devices 110a to 110q are turned on all at once. Accordingly, it is considered that the contrast ratio between the defect and the outer surface becomes small, and for this reason, the defect is not detected (the product is not determined as being "bad").

Thus, according to the first embodiment, as described above, the luminance or the like of the grayscale charts 94 is measured. As described above, the luminance or the like of the grayscale charts 94 being less than or equal to the reference value (the luminance is lower than that of the control charts) implies that the luminosity of the illuminating devices 110a to 110q is not assured. In this case, the computer 114 determines that "the inspection condition is not satisfied," and the connecting rod 10 is excluded from the transport line 32 in the same manner as an unacceptable product. Consequently, a situation is prevented in which a connecting rod 10 is inspected under a situation in which the luminosity of the illumination devices 110a to 110q is not assured and the connecting rod 10 is erroneously judged as being an "acceptable product", which should be judged as being an unacceptable product, is supplied to a next process step via the transport line 32.

In the foregoing manner, according to the first embodiment, even in the case that a situation occurs in which it is presumed that the luminosity of the illumination devices 110a to 110q and the luminance of the connecting rod 10 have decreased, it is possible to avoid a situation in which the computer 114 mistakenly determines an unacceptable product as being an acceptable product. Further, contrary to the above, in the case that the luminance or the like of the grayscale charts 94 exceeds the reference value, the computer 114 determines that the "inspection is satisfactory". In this manner, only connecting rods 10 that have been determined as being acceptable products when the inspection is satisfactory are delivered to the second inspection unit 60. Therefore, the reliability of the inspection result is improved, and it becomes possible to assure the product quality of the connecting rods 10 that are supplied to the next process step.

When the inspection is completed, the two linear actuators are synchronously energized, and the first slider 82 and the second slider 84 move in directions to separate away from each other along the guide rails 85a and 85b. Accompanying such movement, the first gripping claw 78 and the second gripping claw 80 are separated away, respectively, from the large end portion 14 and the small end portion 18, whereby the connecting rod 10 is released from being gripped by the chuck 76, and is placed on the first moving platform 62. Furthermore, the inverting operation robot 64 is operated to grip the rod portion 20 of the connecting rod 10 with the gripping hand 115. Furthermore, the respective arms of the inverting operation robot 64 are appropriately operated to invert the connecting rod 10 upside down. Simultaneously with being inverted, the connecting rod 10 is positioned above the through window 74 that is formed in the table 116 of the second inspection unit 60.

More specifically, concerning the connecting rod 10 that has been moved to the second inspection unit 60, the lower surface thereof that was facing vertically downward in the first inspection unit 56 is placed in a posture of facing vertically upward, whereas the upper surface thereof that was facing vertically upward in the first inspection unit 56 is placed in a posture of facing vertically downward. However, in order to facilitate the distinction therebetween, the lower surface that was facing vertically downward, and the upper surface that was facing vertically upward in the first inspection unit 56, respectively, are also referred to as a lower surface and an upper surface when placed in the second inspection unit 60. In this manner, while the first inspection unit 56 has carried out an inspection on the upper half of the connecting rod 10, the second inspection unit 60 carries out an inspection on the remaining lower half thereof being placed in a vertically upward posture.

Thereafter, the operations are the same as at the time of the inspection by the first inspection unit 56. More specifically, the connecting rod 10 is gripped by the chuck 76 from the side of the large end portion 14 and the side of the small end portion 18, and thereafter, inspection images of the connecting rod 10 are captured in a state in which light is irradiated from the illumination devices 110a to 110q. In this case as well, a determination is made as to whether or not the luminosity of the illumination devices 110a to 110q is assured, or stated otherwise, whether or not the inspection is satisfactory, based on the luminance or the like of the grayscale charts 94.

Of course, the presence or absence of a defect such as a scratch or the like is determined from the inspection images of the connecting rod 10 that were captured by the cameras 112*a* to 112*q*. In the case that the inspection condition is not satisfied, or in the case it is determined that the connecting rod 10 is an acceptable product even if the inspection is satisfactory, the connecting rod 10 is excluded from the exclusion conveyor. On the other hand, connecting rods 10 that have been determined to be acceptable products when the inspection is satisfactory are released from being gripped by the chuck 76, and thereafter, are placed on the second moving platform 66 that has been positioned beforehand in the through window 74.

Thereafter, the second moving platform 66 advances from the evacuation opening 118 of the table 116, and moves to the conveyor outlet 54. Furthermore, the connecting rod 10 on the second moving platform 66 is placed on the second belt 44 of the carry-out side conveyor 36 by the second transfer robot. Due to the circulating operation of the second belt 44, the connecting rod 10 is conveyed by the carry-out side conveyor 36 to the next process step. Accordingly, in this case as well, only connecting rods 10 that have been determined as being acceptable products when the inspection is satisfactory are supplied to the next process step, for example, an assembly process for an internal combustion engine.

By carrying out the actions as described above, the upper surface side (upper half) and the lower surface side (lower half) are individually inspected, and only connecting rods 10 in which defects are not recognized therein can be conveyed to the next process step.

Further, according to the first embodiment, the grayscale charts 94 (plates) are simply provided at the irradiated locations on the first gripping claw 78 and the second gripping claw 80. More specifically, there is no necessity to incorporate a further mechanism into existing equipment, and there is no need to implement a change or a modification in the design layout. Accordingly, it is possible to avoid a situation in which the configuration of the appearance inspection system 30 is made complicated, and to improve the reliability of the inspection result at a low cost. In addition, since the determination is carried out using a plurality of grayscale charts 94, reliability is further improved.

Moreover, when the determination of "the inspection condition is not satisfied" occurs continuously to an excessive degree or excessively frequently, as the cause thereof, it is considered that the grayscale charts 94 have become dirty. In such a case, the grayscale charts 94 may be cleaned. Alternatively, the grayscale charts 94 may be cleaned periodically in order to avoid such a condition.

Further, control images may be created in which both a control scale and the reference sample are reflected, and by comparing the control images and the inspection images, a determination may be made as to whether or not the luminance or the like of the grayscale charts 94 in the inspection images is less than the luminance or the like of the control charts. In accordance with this feature as well, it is also possible to determine whether or not the inspection is satisfactory.

Next, a description will be given concerning an appearance inspection system according to a second embodiment. FIG. 6 is a schematic overall perspective view of a first gripping claw 130 and a second gripping claw 132 constituting the appearance inspection system according to the second embodiment. In this case, the first gripping claw 130 and the second gripping claw 132 include the same constituent elements as those in the first embodiment. Accordingly, the same constituent elements as those shown in FIG. 3 are designated with the same reference numerals, and detailed description thereof is omitted.

Instead of the grayscale charts 94, light receiving devices 134 are provided at the irradiated locations on the first gripping claw 130 and the second gripping claw 132. As the light receiving devices 134, for example, known devices including photodiodes may be adopted.

In this case, in the first inspection unit 56 and the second inspection unit 60, when the light from the illumination devices 110*a* to 110*q* is irradiated onto the connecting rod 10, the light is also irradiated onto a plurality (eight, in this case) of the light receiving devices 134. Stated otherwise, the light receiving devices 134 receive such light. The photodiodes that make up the light receiving devices 134 convert the light into electricity. As the luminance becomes greater, the conversion amount into electricity also becomes greater. Accordingly, on the basis of the amount of electricity generated by the photodiodes, it is possible to measure the luminance of the light irradiated onto the light receiving devices 134.

In this case, when the measured value of the luminance is less than or equal to the preset reference value, the computer 114 determines that "the inspection condition is not satisfied," and transmits the result as an information signal to the control unit 120. The control unit 120 that has received such an information signal performs a control to exclude the connecting rod 10 from the exclusion conveyor in the same manner as in the first embodiment.

On the other hand, when the measured value of the luminance exceeds the preset reference value, the computer 114 determines that the "inspection is satisfactory". In this case, if the connecting rod 10 is an acceptable product, it is supplied to the next process step, and if the connecting rod 10 is an unacceptable product, it is excluded from the exclusion conveyor. Accordingly, the same advantageous effects as those of the first embodiment can be obtained in the second embodiment as well.

The present invention is not particularly limited to the first and second embodiments described above, and various modifications can be made thereto without departing from the essence and gist of the present invention.

For example, it goes without saying that structural objects (members) other than the connecting rods 10 may serve as the object to be inspected.

Further, according to the embodiments, although the determination is carried out by the computer 114, the computer 114 may transmit the inspection result as information to the control unit 120, and the determination may be carried out by the control unit 120 which has received the information.

Furthermore, prior to making a determination concerning the presence or absence of the scratch 122, a determination may be made as to whether the inspection is satisfactory or unsatisfactory, based on the luminance or the like of the grayscale charts 94 or measured values of the luminance of the light receiving devices 134.

What is claimed is:

1. An appearance inspection system configured to determine whether an external appearance of an object to be inspected is good or bad based on a captured image of the object to be inspected, the appearance inspection system comprising:
   a retaining tool configured to retain the object to be inspected;

an illumination device being separate from the retaining tool and configured to irradiate light onto the retaining tool and the object to be inspected that is retained by the retaining tool;

an image capturing device configured to capture an image of the object to be inspected irradiated with the light; and a determination unit configured to determine whether the external appearance of the object to be inspected is good or bad, based on an image of the object to be inspected obtained by the image capturing device, wherein a photoelectric conversion device is provided on an irradiated location which is on the retaining tool and is irradiated with the light emitted by the illumination device, and the determination unit compares a measured value of a luminance measured with the photoelectric conversion device with a preset reference value that is preset at the determination unit, the determination unit determines that an inspection condition is not satisfied when the measured value is less than or equal to the preset reference value.

2. The appearance inspection system according to claim 1, wherein the light receiving device is disposed at a plurality of locations on the retaining tool.

3. The appearance inspection system according to claim 1, comprising a plurality of the illumination devices, wherein one portion of the plurality of illumination devices emits light that travels toward the object to be inspected from a horizontal direction, another portion of the plurality of illumination devices emits light that travels toward the object to be inspected from diagonally above the object to be inspected, and one of the plurality of illumination devices emits light that travels toward the object to be inspected from vertically above the object to be inspected.

4. The appearance inspection system according to claim 3, comprising a same number of the image capturing devices as a number of illumination devices, wherein respective assemblies are constituted by combining respective ones of the plurality of image capturing devices with respective ones of the plurality of illumination devices.

5. The appearance inspection system according to claim 1, wherein an inspection is performed on a connecting rod that constitutes an internal combustion engine, the connecting rod serving as the object to be inspected.

6. An appearance inspection system configured to determine whether an external appearance of an object to be inspected is good or bad based on a captured image of the object to be inspected, the appearance inspection system comprising:

a retaining tool configured to retain the object to be inspected;

an illumination device configured to irradiate light onto the object to be inspected that is retained by the retaining tool;

an image capturing device configured to capture an image of the object to be inspected irradiated with the light; and a determination unit configured to determine whether the external appearance of the object to be inspected is good or bad, based on an image of the object to be inspected obtained by the image capturing device, wherein a grayscale chart is provided on an irradiated location which is on the retaining tool and is irradiated with the light emitted by the illumination device, the determination unit acquires a luminance or a gradation value of the grayscale chart, from a captured image of the grayscale chart captured by the image capturing device, and the determination unit determines that an inspection condition is not satisfied when the acquired luminance or gradation value of the grayscale chart is less than or equal to a preset reference value.

7. The appearance inspection system according to claim 6, wherein the grayscale chart is disposed at a plurality of locations on the retaining tool.

8. The appearance inspection system according to claim 6, comprising a plurality of the illumination devices, wherein one portion of the plurality of illumination devices emits light that travels toward the object to be inspected from a horizontal direction, another portion of the plurality of illumination devices emits light that travels toward the object to be inspected from diagonally above the object to be inspected, and one of the plurality of illumination devices emits light that travels toward the object to be inspected from vertically above the object to be inspected.

9. The appearance inspection system according to claim 8, comprising a same number of the image capturing devices as a number of illumination devices, wherein respective assemblies are constituted by combining respective ones of the plurality of image capturing devices with respective ones of the plurality of illumination devices.

10. The appearance inspection system according to claim 6, wherein an inspection is performed on a connecting rod that constitutes an internal combustion engine, the connecting rod serving as the object to be inspected.

* * * * *